(12) United States Patent
Schneider

(10) Patent No.: US 9,868,879 B2
(45) Date of Patent: Jan. 16, 2018

(54) HOT-MELT ADHESIVE AND USE THEREOF

(71) Applicant: IP & Patent Management UG (haftungsbeschränkt), Bremen (DE)

(72) Inventor: Jörg Schneider, Bremen (DE)

(73) Assignee: IP & Patent Management UG, Bremen (DE)

( * ) Notice: Subject to any disclaimer, the term of this patent is extended or adjusted under 35 U.S.C. 154(b) by 0 days.

(21) Appl. No.: 14/905,032

(22) PCT Filed: Jul. 16, 2014

(86) PCT No.: PCT/EP2014/065274
§ 371 (c)(1),
(2) Date: Jan. 14, 2016

(87) PCT Pub. No.: WO2015/007786
PCT Pub. Date: Jan. 22, 2015

(65) Prior Publication Data
US 2016/0160086 A1 Jun. 9, 2016

(30) Foreign Application Priority Data

Jul. 17, 2013 (EP) .................................. 13176817

(51) Int. Cl.
| | | |
|---|---|---|
| C09J 123/08 | (2006.01) | |
| B65D 71/00 | (2006.01) | |
| C09J 153/02 | (2006.01) | |
| C09J 5/00 | (2006.01) | |

(52) U.S. Cl.
CPC ............ *C09J 5/00* (2013.01); *C09J 123/0815* (2013.01); *C09J 2201/61* (2013.01); *C09J 2423/04* (2013.01); *C09J 2453/00* (2013.01); *C09J 2467/006* (2013.01); *C09J 2491/00* (2013.01)

(58) Field of Classification Search
CPC .. C09J 123/0815; C09J 5/00; C09J 2467/006; C09J 2453/00; C09J 2423/04; C09J 2491/00; C09J 2201/61; C08L 53/02; C08L 91/06; C08K 5/005; B65B 17/02
See application file for complete search history.

(56) References Cited

U.S. PATENT DOCUMENTS

| 5,331,038 A | 7/1994 | Dillman |
| 2008/0076860 A1 | 3/2008 | Ahmed et al. |
| 2008/0241528 A1* | 10/2008 | Broos .................... C08G 69/44 |
| | | 428/355 N |
| 2011/0213067 A1 | 9/2011 | Moeller et al. |
| 2013/0165568 A1 | 6/2013 | Goubard |

FOREIGN PATENT DOCUMENTS

| WO | WO 94/07967 A1 | 4/1994 |
| WO | WO 2008/039901 A2 | 4/2008 |
| WO | WO 2010/026172 A1 | 3/2010 |

OTHER PUBLICATIONS

International Search Report of PCT/EP2014/065274 dated Sep. 16, 2014.

\* cited by examiner

*Primary Examiner* — Jeffrey Mullis
(74) *Attorney, Agent, or Firm* — Arthur M. Reginelli; Renner, Kenner

(57) ABSTRACT

Use of a hot-melt adhesive for adhesive bonding of at least a first packaging and a second packaging, the hot-melt adhesive comprising: (a) 50-85 parts per weight of a basis polymer, wherein the basis polymer is consisting of a metallocene catalyzed polyolefin polymer, preferably ethene-1-octene-copolymer; (b) 10-25 parts per weight of a modifying polymer, the modifying polymer comprising a styrene block copolymer; (c) 5-25 parts per weight of a reinforcing wax, preferably a polyethylene wax or a wax produced by the Fischer-Tropsch synthesis route, the wax component preferably comprising paraffinic oil, naphthenic oil, polybutene, dibasic ester, polyol or mixtures thereof; and (d) 0.05-1.5 parts per weight of a stabilizer component comprising a sterically hindered phenolic antioxidant and/or a hindered amine light stabilizer and a pack comprising the hot-melt adhesive.

9 Claims, No Drawings

HOT-MELT ADHESIVE AND USE THEREOF

The present invention relates to the use of a hot-melt adhesive for adhesive bonding of packaging and a pack comprising the hot-melt adhesive.

Traditionally the formation of multiple containers for beverages or food to form a pack of various items (in the following abbreviated in "pack" or "multipack") has only been possible by the employment of a shrink sleeve film, cardboard outer wrap or a mechanical locking/holding arrangement.

There are inherent problems with the shrink sleeve multipack arrangement in that the individual containers are difficult to remove. Often sharp tools are used to open the secondary pack aging with the result that without purpose the product containers are damaged. The cardboard overwrap can also be problematic as the construction can be unstable, particularly with heavier shaped containers.

Both methods (shrink sleeve and cardboard) or other secondary packaging involve the use of packaging materials in addition to the beverage or food container, leading to higher levels of packaging waste.

Hot-melt adhesives are widely used for various commercial and industrial applications such as product assembly and packaging. Such hot-melt adhesives are applied to a substrate while in its molten state and cooled to harden the adhesive layer.

Current commercial hot-melt adhesive formulations do not provide the necessary performance characteristics necessary for application.

To fulfill this function, the adhesive must display a very high level of cohesive strength, heat resistance and provide good levels of adhesion to the container in transit and storage in a wide variety of ambient conditions. But when the multipack reaches the consumer, the individual containers have to be relatively easy to be separated allowing individual consumption of the contents of the containers.

An adhesive mixture has to have sufficient adhesion to the substrates to hold the containers together in a broad range of ambient conditions, including high and low temperatures, high and low humidity and environments with high UV exposure. The adhesive mixture must also have sufficient flexibility to allow expansion in the adhesive joint as the container expands and contracts during its exposure to the different prevailing environmental conditions.

The adhesive must be able to be applied easily in a high speed automated process, concurrent with a modern high speed beverage or food filling or processing line/machine.

Therefore, it is an object of the present invention to provide adhesive mixtures for adhering packagings, for example containers, such as PET-bottles, cans or glass bottles having sufficient durability and adhesion to hold the container together until the consumer desires separation.

Further, a hot-melt adhesive mixture for use in the temporary bonding, attachment and collation of multiple containers, preferably for beverages or food, to form a pack of various items in an automated application process, without the use of secondary/external packaging, overcoming drawbacks of the prior art shall be provided.

The purpose of this invention is further to provide the multipack arrangement but greatly reducing the amount of packaging material used in the formation.

The object has been achieved by the use of a hot-melt adhesive for adhesive bonding of at least a first packaging and a second packaging, the hot-melt adhesive comprising:
 (a) 50-85 parts per weight, preferably 60-80 parts per weight, of a basis polymer, wherein the basis polymer is consisting of a metallocene catalysed polyolefin polymer, preferably ethene-1-octene-copolymer;
 (b) 10-25 parts per weight, preferably 15-20 parts per weight, of a modifying polymer, the modifying polymer comprising a styrene block copolymer;
 (c) 5-25 parts per weight, preferably 5-10 parts per weight, of a wax, preferably a (reinforcing) polyethylene wax or a wax produced by the Fischer-Tropsch synthesis route, the wax component preferably comprising paraffinic oil, naphthenic oil, polybutene, dibasic ester, polyol or mixtures thereof; and
 (d) 0.05-1.5 parts per weight, preferably 0.5-1.0 parts per weight, of a stabilizer component comprising a sterically hindered phenolic antioxidant and/or a hindered amine light stabilizer.

Preferably, the basis polymer is comprised in the hot-melt adhesive in an amount of at least 55 parts per weight, preferably 60 parts per weight, preferably 65 parts per weight, preferably 70 parts per weight, preferably 75 parts per weight, preferably 80 parts per weight.

Preferably, the basis polymer is comprised in the hot-melt adhesive in an amount of not more than 80 parts per weight, preferably 75 parts per weight, preferably 70 parts per weight, preferably 65 parts per weight, preferably 60 parts per weight, preferably 55 parts per weight.

Preferably, the modifying polymer is comprised in the hot-melt adhesive in an amount of at least 15 parts per weight, preferably 20 parts per weight.

Preferably, the modifying polymer is comprised in the hot-melt adhesive in an amount of not more than 20 parts per weight, preferably 15 parts per weight.

Preferably, the wax is comprised in the hot-melt adhesive in an amount of at least 10 parts per weight, preferably 15 parts per weight, preferably 20 parts per weight.

Preferably, the wax is comprised in the hot-melt adhesive in an amount of not more than 20 parts per weight, preferably 15 parts per weight, preferably 10 parts per weight.

Preferably, the stabilizer component is comprised in the hot-melt adhesive in an amount of at least 0.2 parts per weight, preferably 0.4 parts per weight, preferably 0.6 parts per weight, preferably 0.8 parts per weight, preferably 1.0 parts per weight, preferably 1.2 parts per weight, preferably 1.4 parts per weight.

Preferably, the stabilizer component is comprised in the hot-melt adhesive in an amount of not more than 1.4 parts per weight, preferably 1.2 parts per weight, preferably 1.0 parts per weight, preferably 0.8 parts per weight, preferably 0.6 parts per weight, preferably 0.4 parts per weight, preferably 0.2 parts per weight.

A hot-melt adhesive in terms of the present invention shall be understood as a form of thermoplastic adhesive. Hot-melt adhesives are also known in the art as hot glues. A hot-melt adhesive is solid at room temperature and is melted to then being applied to the surface to be adhered. By cooling the melted hot-melt adhesive, strong adhesive bonding is achieved.

Adhesive bonding in terms of the present invention is applying to an intermediate layer to connect substrates of different materials. In the inventive use, the intermediate layer is formed by the hot-melt adhesive. The substrates are the packagings to be connected.

The inventive use relates to adhesive bonding of at least two packagings. However, the inventive use relates also to adhesive bonding of more than two packagings. In this embodiment, each packaging is connected to at least another packaging by adhesive bonding using the hot-melt adhesive as defined in the inventive use.

In general, any packaging can be applied in the inventive use. Packaging shall be understood as a material used for enclosing or protecting products for distribution, storage, sale, and use.

Preferably, the packaging is a foodstuff packaging, preferably a foodstuff container, more preferably a bottle or can, most preferably a plastic bottle.

In the preferred embodiment, wherein the packaging is a bottle, the term bottle shall be understood broadly and encompass PET-bottles, glass-bottles, cans etc.

Further preferred, the basis polymer is an elastomer.

An elastomer in terms of the present invention shall be understood as a polymer with viscoelasticity, generally having low Young's modulus and high failure strain compared with other materials. In general, elastomers are amorphous polymers existing above their glass transition temperature, so that considerable segmental motion is possible. Therefore, at ambient temperatures, elastomers are relatively soft and deformable.

The basis polymer is a polyolefin polymer, preferably a linear low density polyethylene, preferably ethene-1-octene copolymer, and/or metallocene-catalysed polyolefin polymer.

A metallocene-catalysed polymer in terms of the present invention is a polymer produced using metallocene catalysts, preferably single-site metallocene catalysts, which produce polymers with a narrow molecular weight distribution and uniform molecular architecture, so that the order and orientation of the monomers in the polymer and the amount and type of branching is essentially the same in each polymer chain. The narrow molecular weight distribution and uniform molecular architecture provides metallocene-catalyst polymers with properties that are not available with conventional polymers, and allow polymers to be produced having unique properties that are specifically tailored to a particular application. The desired molecular weight distribution and the molecular architecture obtained by the selection of the appropriate metallocene-catalyst in polymerization conditions. The term "metallocene-catalyst" in terms of the present invention shall be broadly understood. Besides typical metallocene complexes comprising two cyclopentadienyl moieties also complexes comprising only a single (or even more than two) cyclopentadienyl moiety, such as constrained geometry catalysts (so-called DOW-catalysts) shall be encompassed. It is obvious to those skilled in the art that the term "cyclopentadienyl moiety" as used herein encompasses also substituted cyclopentadienyl moieties, wherein the substituents can be of any kind and encompass also condensed ring systems. In this context, a cyclopentadienyl moiety may also be understood as any suitable $\eta^5$-ligand. Preferably (and due to the above discussed mechanism of its preparation), the metallocene-catalyst polymer is a linear low-density polyethylene (LLDPE).

A polyolefin in terms of the present invention is any class of polymer produced from a simple olefin (alkene of the general formula $C_nH_{2n}$) as a monomer. Also encompassed shall be polyolefin copolymers.

A copolymer shall be understood as polymers comprising two or more different monomer units.

Preferably, the modifying polymer further comprises ethylene-butyl-acrylate/vinyl-acetate copolymer, catalysed elastomers or mixtures thereof.

A block-copolymer is a special kind of copolymer made of blocks of different polymerized monomers.

Further preferred, the styrene block copolymer (styrenic block co-polymer) is polystyrene-block-polyolefin, preferably is polystyrene-block-poly(ethylene-RAN-butylene)-block-polystyrene, with RAN meaning random distribution of ethylene and butylene, or polystyrene-block-polybutadiene-block-polystyrene, optionally hydrogenated.

In a further preferred embodiment, the reinforcing agent is a polyethylene-wax or a Fischer-Tropsch-wax.

Moreover preferred, the reinforcing agent comprises paraffinic oil, naphthenic oil, polybutadiene, dibasic ester, polyol or mixtures thereof.

A Fischer-Tropsch-wax essentially contains saturated non-branched hydrocarbons. The content of branched chains is particularly small. The linear structure is one of the essential features coming along with desired properties of Fischer-Tropsch-waxes, such as high melting point, low viscosity and high hardness.

A dibasic ester in terms of the present invention is an ester of a dicarboxylic acid.

Preferably, the stabilizer is a light stabilizer, preferably is a sterically hindered phenolic antioxidant and/or a sterically hindered amine, most preferably is pentaerythritol tetrakis (3-(3,5di-tert-butyl-4-hydroxyphenyl)propionate).

In general, stabilizers, are compounds which prevent, when being comprised in a polymer, various effects, such as oxidation, chain scission, uncontrolled recombinations and cross-linking reactions that are caused by, for example, photo-oxidation of polymers. Light stabilizers are, therefore, to be understood as compounds to be used to avoid effects coming along when being exposed to electromagnetic radiation, particularly light.

The problem has further been solved by a pack, preferably a multipack, essentially comprising at least two packagings and a hot-melt adhesive; wherein each packaging is connected to at least one other packaging by adhesive bonding, the adhesive bonding being made by the hot-melt adhesive, and the hot-melt adhesive being the hot-melt adhesive as defined for the inventive use.

The inventive pack is essentially comprised of two or more packagings being adhered together by using the hot-melt adhesive as defined herein. Essentially comprising shall be understood that no other means to build a multipack arrangement of the packaging, such as shrink sleeve or cardboard overwrap, are necessary. Nevertheless, presence of such materials for decoration purpose or the like is not excluded. Just as little other decoration elements, brands, labels or technical means for solving another problem etc. are excluded.

Preferably, the packaging in the pack is a foodstuff packaging, preferably a foodstuff container, more preferably a bottle.

The problem has further been solved by the hot-melt adhesive having a density of between 0.790-1.2 $g/cm^3$, a melt flow index of 15-4000 g/min (1 kg at 200° C.), a viscosity of 160° C. between 200 and 10,000, preferably 11,000 cPs, preferably 10,000 cPs, measured by using a Brookfield RVT visometer, spindle SC-4-27 according to ASTM D3236 (1999), a Shore hardness in the range of 15 and 70 A at 23° C. according to ASTM D2240, and a softening point determined by ASTM E28 above 40° C. and not greater than 158° C.

Preferably, the hot-melt adhesive compound is obtainable from an inventive hot-melt adhesive mixture the mixture comprising ingredients and as defined above. More preferably, the hot-melt adhesive is obtainable by blending.

Most preferably, the inventive hot-melt adhesive mixture and/or the inventive hot-melt adhesive have a relatively flat elastic modulus from −20° C. to 50° C., extremely good heat stability, Tg of about −32° C., fogging temperature above 100° C., low volatiles content over 0.10% after two hours at 110° C., viscosity at 160° C. of about 700-4000 mPas or mixtures thereof.

In terms of the present invention, an "extremely good heat stability" of the inventive hot-melt adhesive mixture is provided when the adhesive has an oxidation reduction time, determined according to ASTM E3895-98 of 12 minutes, preferably 12.28 minutes, or greater at 150° C.

In terms of the present invention, the hot-melt adhesive has a "low volatiles content" when having a volatile emission measured in percentage terms of 0.1% or less, according to ASTM E 595-93. In this way, fogging or coating of the substrate with low molecular weight hydrocarbons during the application of the adhesive is avoided.

In a preferred embodiment, the inventive hot-melt adhesive mixture and/or the inventive hot-melt adhesive having a high level of cohesive strength, heat resistance, good adhesion to the preferably beverage and/or food containers in transit and storage in a wide variety of ambient conditions. At the same time, when a multipack (meaning a plurality of packings adhesive bound by means of the hot-melt adhesive) reaches the consumers the hot-melt adhesive specific properties enables the consumers to separate easily the containers allowing individual consumption of the contents of the containers.

A "good adhesion" in terms of the present invention is meant to be an adhesion between the bound packagings allowing secure storage and transport of the bound packagings but also allowing a separation of the packagings without undue body strength or tools. In particular preferred is an adhesion of 15N/25 mm or less, determined by peel adhesion (180° C.) or loop tack (23° C.) methods. Even more preferred is an adhesion of 10 N/25 mm or less, particular preferred 5 N/25 mm or less.

The object has also been solved by inventive use of the hot-melt adhesive mixture and/or the hot-melt adhesive, in particular for adhering multiple containers for beverages or food to form a pack of various items in an automated application process, without the use of secondary/external packaging.

The adhesive mixture herein mentioned has been carefully designed and constructed to provide sufficient durability and adhesion to hold the containers together until the consumer desires separation.

The problem is further solved by the inventive use of a hot-melt adhesive mixture as defined above to adhere multiple containers for beverages or food to form a pack of various items in an automated application process, without the use of secondary/external packaging.

In very preferred embodiments, the inventive hot-melt mixture is achieved from a mixture of:
a) a basic polymer component consisting of metallocene catalyzed polyolefin polymer, typically known as a ethene-1-octene co-polymer (CAS number 26221-73-8) which has a ring & ball softening point from 55° C. to 150° C., and typically has a viscosity at 350° F. (177° C.) as measured using a Brookfield viscometer, of no more than 13000 cPs (20 grams/cat second). A commercially known example of this product is Dow Affinity series POP polymer with a polymer content of 50-85 parts per weight.
b) a modifying polymers/rubbers comprising of a blend of A-B-A hydrogenated styrene butadiene co-polymers (CAS number 66070-58-4). A commercially known example of this product is the Kraton G series of polymers.
c) a reinforcing wax component typically (preferably) being a PE (Polyethylene) wax (CAS number 9002-88-4) and/or a wax produced by the Fischer-Trops synthesis route (CAS number 8002-74-2). Commercially available examples of these products are Marcus 200 series and Sasol H1.
d) a stabilizer component of a steric hindered phenolic antioxidant and/or a hindered amine light stabilizer (CAS number 6683-19-8).

The inventive effect may be traced back to interactions of the compounds as described below in detail. However, this rather scientific discussion shall merely be understood to facilitate the understanding of the invention, without having any limiting effect on the scope of the invention.

The use of inventive modifying polymer, preferably a A-B-A hydrogenated styrene butadiene block co-polymer, in combination with the basis polymer, preferably metallocene catalyzed olefin co-polymer/polyolefin elastomer based hotmelt adhesive and the reinforcing agent (wax blend) gives the specific desired properties for the adhesive mixture.

Alone the basis polymer, in preferred embodiments the metallocene catalyzed olefin/polyolefin elastomer based hotmelt adhesive, does not have sufficient tensile strength and elasticity to fulfill the application at the range of temperatures desired.

Therefore, it was decided to add on the modifying polymer, preferably the A-B-A hydrogenated styrene butadiene block co-polymer, in order to enhance the tensile strength and elasticity of the adhesive. It is especially innovative the usage of Kraton G in combination with metallocene/polyolefin elastomer based hotmelt adhesive as it is very compatible, probably due to the saturated midblock content.

This component of the mixture is also assumed to act to reduce the adhesion of the hot-melt to the container allowing the containers to be separated when desired.

The use of the reinforcing agent is deemed to adjust the viscosity of the blend to the correct level, allowing the correct flow characteristics during application.

Further advantages coming along with the inventive use of the hot-melt adhesive are high green strength (high tack), rapid set during compression cycle and very stable viscosity.

The clear advantage of allowing increased mileage (lower consumption of hot-melt in comparison with other hot-melts is a clear benefit).

However, the major breakthrough appears to be the interaction of the three components as the modified polymer/rubber is providing the elasticity and the tensile strength, whilst the reinforcing agent is adjusting viscosity.

Surprisingly it was found that the inventive use of the inventive mixtures and compounds have the advantage of greatly reducing the amount of packaging in an inventive multipack construction pack while providing a stable multipack which is easily separated by the consumer.

Due to the nature of the application each named component may be comprised of a singular component or a blend of components in order to achieve the desired properties.

The hot-melt adhesive can be made by blending in a heated mixing vessel of the planetary type, z blade or ribbon type. Heat must be applied to the walls of the vessel evenly to avoid thermal degradation during processing. Processing temperature is in the 100-160° C. range. A vacuum should be applied during the blending process to avoid the incorporation of air. The hot-melt adhesive can also be prepared using a single screw or twin screw extruder with a heated barrel using moderate shear rates.

However, the major breakthrough is the interaction of the three components as the modified polymer/rubber is providing the elasticity and the tensile strength, whilst the reinforcing agent is adjusting viscosity.

This invention relates to the use of a hot-melt adhesive mixture for the temporary bonding, attachment and collation of multiple containers for beverages or food to form a pack of various items in an automated application process, without the use of secondary/external packaging.

The adhesive is applied directly or indirectly to the container by means of automatic jet, wheel or any other appropriate method.

Upon reaching the consumer the containers can be separated from each other prior to use. The adhesive on the container surface can be removed by mechanical means to aid recycling.

EXAMPLES

Several hot-melt adhesive composition according to the invention were prepared. All of the compositions featured good adhesion of not more than 15 N/25 mm according to peel adhesion (180° C.) and loop tack (23° C.) for connecting PET packagings.

Hot-melt adhesives according to the invention, exemplary compositions of which are shown in the below Table 2, where compared with adhesives known from the prior art, the compositions and properties of which are summarized in Table 1.

As it is evident from the below results, the hot-melt adhesives according to the invention feature superior properties in the inventive use.

TABLE 1

Removable adhesives of the prior art.

| Typical SBS/SIS removable adhesive | Parts by Weight % | Typical SEBS removable adhesive | Parts by Weight % |
|---|---|---|---|
| SIS Block-copolymer 15% styrene/melt flow index (200° C./5 Kg) = 25 | 20 | SEBS Block-copolymer 30% styrene/melt flow index (230° C./5 Kg) = 5 | 31.4 |
| SBS Block-copolmyer 43% styrene-block-copolymer/melt flow index (200° C./5 kg = 25 | 22.2 | DCPD Resin | 46 |
| White mineral oil | 20 | White mineral oil | 22 |
| Paraffin wax 62-68 | 5 | Micro crystalline wax | 0.5 |
| DCPD resin | 32 | Antioxidant/stabilisor package | 0.1 |
| Stabiliser package | 0.8 | | |
| Peel adhesion 180° to PET initial after 24 hrs* | 5.2 N/25 mm | Peel adhesion to PET | 4.89 N/25 mm |
| SAFT (heat resistance) ASTM D4498-07 modified 100 g weight used | 40 | | 40 |
| Viscosity @ 170 C. ASTM D3236 Brookfield SC-4-27 | 1000 cPs | | 980 cPs |
| Loop tack initial PET after 24 hrs at 23° C.* | 6.42 N/25 mm | Loop Tack | 5.4 N/25 mm |
| Peel adhesion 180° PET after 28 days at 23° C. | 15 N/25 mm | Peel adhesion 180° after 28 days at 23° C. | 18.4 N/25 mm |
| Loop tack after 28 days at 23° C. | 13.6 N/25 mm | Loop tack after 28 days at 23° C. | 16.42 N/25 mm |

*FINAT test methods

TABLE 2

Compositions of the invention

| Ingredients/Properties | Type V20 % by weight | Type V22 % by weight | Type V25 % by weight |
|---|---|---|---|
| SEBS Block-copolymer 30% styrene/melt flow index (230° C./5 Kg) = 5 | 12 | 20 | 25 |
| Mettallocene catalysed polyolefin blend | 65.5 | 58 | 53 |
| White mineral oil | 22 | 22 | 22 |
| Stabiliser package | 0.5 | 0.5 | 0.5 |
| SAFT (heat resistance) ASTM D4498-07 modified 100 g weight used | 45 | 45 | 55 |
| Viscosity @ 170 C. ASTM D3236 Brookfield RVT SC-4-27 | 5,800 cPs | 8,800 cPs | 10,260 cPs |
| Peel adhesion 180° to PET initial after 24 hrs* | 9.5 N/25 mm | 8.4 N/25 mm | 1.6 N/25 mm |
| Loop tack initial PET after 24 hrs at 23° C. * | 10 N/25 mm | 8 N/25 mm | 4 N/25 mm |

TABLE 2-continued

Compositions of the invention

| Ingredients/Properties | Type V20 % by weight | Type V22 % by weight | Type V25 % by weight |
|---|---|---|---|
| Peel adhesion 180° PET after 28 days at 23° C.* | Not measurable | 4 N/25 mm | 1.6 N/25 mm |
| Loop tack after 28 days at 23° C.* | Not measurable | 11.25 N/25 mm | 9.54 N/25 mm |

All documents cited herein are incorporated in their entireties by reference.

The features disclosed in the foregoing description and/or in the claims may, both separately and in any combination thereof, be material for realizing the invention in diverse forms thereof.

The invention claimed is:

1. A multipack comprising:
   a first packaging;
   a second packaging; and
   a hot-melt adhesive temporarily adhering said first packaging to said second packaging; the hot-melt adhesive comprising
   (a) 50-85 parts by weight of a basis polymer, wherein the basis polymer is a metallocene catalysed polyolefin polymer;
   (b) 10-25 parts by weight of a modifying polymer, the modifying polymer comprising a styrene block copolymer;
   (c) 5-25 parts by weight of a reinforcing agent, the reinforcing agent comprising a wax; and
   (d) 0.05-1.5 parts by weight of a stabilizer component selected from the group consisting of a sterically hindered phenolic antioxidant, a hindered amine light stabilizer, and mixtures thereof.

2. The multipack of claim 1, wherein the basis polymer is an elastomer.

3. The multipack of claim 1, wherein the basis polymer is an ethene-1-octene copolymer.

4. The multipack of claim 1, wherein the modifying polymer further comprises ethylene-butyl-acrylate or vinyl-acetate copolymer.

5. The multipack of claim 1, wherein the styrene block copolymer is selected from the group consisting of polystyrene-block-polyolefin, polystyrene-block-poly(ethylene-RAN-butylene)-block-polystyrene, and polystyrene-block-polybutadiene-block-polystyrene, optionally hydrogenated.

6. The multipack of claim 1, wherein the reinforcing agent is selected from the group consisting of a polyethylene-wax, a Fischer-Tropsch-wax, and mixtures thereof.

7. The multipack of claim 1, wherein the reinforcing agent further comprises paraffinic oil, naphthenic oil, polybutadiene, dibasic ester, polyol, and mixtures thereof.

8. The multipack of claim 1, wherein the stabilizer is pentaerythritol tetrakis(3-(3,5-di-tert-butyl-4-hydroxy-phenyl) propionate.

9. The multipack of claim 1, wherein the at least two packagings are foodstuff packaging selected from the group consisting of a plastic bottle and a can.

* * * * *